United States Patent

Miller

[15] 3,646,534

[45] Feb. 29, 1972

[54] HIGH-DENSITY DATA PROCESSING

[72] Inventor: Wendell S. Miller, 1341 Comstock Street, Los Angeles, Calif. 90024

[22] Filed: May 5, 1969

[21] Appl. No.: 821,627

[52] U.S. Cl. .........340/174.1 G, 179/100.2 MD, 340/174.1 H

[51] Int. Cl. ..........G11b 5/06

[58] Field of Search ..........340/174.1 F, 174.1 G, 174.1 H; 179/100.2 MI

[56] References Cited

UNITED STATES PATENTS 3,211,841 10/1965 Uemura et al. ..........179/100.2

3,217,329 11/1965 Gabor..........340/174.1

*Primary Examiner*—Bernard Konick

*Assistant Examiner*—J. Russell Goudeau

*Attorney*—William P. Green

[57] ABSTRACT

A high-density data processing system in which individual data bits are represented in coded form as changes in state of a predetermined data output unit, with two or more different types of bits being distinguished from one another by shifting the occurrence of a particular change of state to a slightly different time if it represents a bit of a first type than if it represents a bit of a second type. A decoding or playback device may then be designed to respond to the specified changes in state in a manner reading out the different types of bits in accordance with their relative timing.

31 Claims, 7 Drawing Figures

WENDELL S. MILLER
INVENTOR

BY William P. Green
ATTORNEY

WENDELL S. MILLER
INVENTOR

BY William P. Green
ATTORNEY

INVENTOR.
WENDELL S. MILLER

BY William P. Green
ATTORNEY

HIGH-DENSITY DATA PROCESSING

BACKGROUND OF THE INVENTION

This invention relates generally to improved data processing apparatus, of a type usable in computers and other equipment for coding and/or decoding a series of data bits at high density. It is contemplated broadly that a coding system embodying the invention can be utilized to advantage in numerous different types of data recording and readback systems, as well in non-recording data processing equipment in which the information being handled is coded and decoded simultaneously at different locations, as in pulse code modulation telephone equipment and the like. However, the invention will be described primarily as applied to data recording equipment and typically to recording equipment of the magnetic type.

In digital computers and other equipment in which a series of data bits are recorded or otherwise processed, it is usually desirable to pack the data bits on the track or in the processing apparatus at as great a density as is possible, in order to maximize the amount of information which can be stored in a particular amount of space, or handled in a particular interval of time, and to otherwise improve the overall operational effectiveness of the system. However, as the bit density is increased, it becomes increasingly more difficult to maintain a sharply defined and positively readable demarcation between successive bits, and as a result conventional systems have been much more limited in attainable and practical density than would be desired. To increase the attainable density, there have been developed certain special waveforms and coding systems intended to overcome some of the problems caused by pulse crowding. For example, one such system is that known as the phase shift arrangement, in which each individual bit is written as a sequence of two successive electrical or magnetic pulses in opposite directions, with the difference between two types of bits (e.g., ones and zeros) being indicated by the order in which the two opposite direction pulses occur. A second partial solution to the difficulties of pulse crowding is attained by a system known as frequency doubling, in which a first type of bit is written as a single pulse, while a second and different type of bit is written as two successive pulses of opposite direction within a single bit cell.

Though both of these partial solutions to the bit density problem have been successful to a certain extent, and have in fact increased the attainable density, they have nevertheless still left a great deal to be desired in maximizing the extent to which bits can be packed together closely. This has been true to a very substantial extent because each of the two systems is so designed as to necessarily require two different changes in state of the coding equipment and/or record track within at least some of the individual bit cells. For example, in a magnetic recording arrangement, these systems require at many points along the record track that within a single bit cell the magnetic tape or other magnetic medium be first magnetized in one direction and then magnetized in the opposite direction within the same cell, in order to indicate within that single cell a single data bit, with the resultant requirement for utilization of an undesirably excessive portion of the tape to properly accept and record this double change in state in an effectively readable manner. All prior coding systems of which I am aware which have not included this requirement for at least two changes of state within some of the bit cells have had other disadvantages which have made them even less desirable than the phase shift and frequency doubling arrangements.

SUMMARY OF THE INVENTION

The present invention provides a greatly improved coding arrangement which achieves all of the primary advantages of both the phase shift and frequency doubling systems, and which in addition overcomes their above discussed disadvantages, and therefore enables the attainment of a vastly increased bit packing density, while still distinguishing between different types of bits in a very positively and reliably readable respect, and preferably in a manner enabling self-clocking of a single track of information. More specifically, in equipment which processes information written in accordance with this invention, each of the various data bits may be represented or written as a single significant change in state of the coding equipment or record track per bit, as from a first magnetic or electrical polarity to the opposite polarity, or from a first condition of frequency modulation to a second frequency modulated condition, without return during that particular bit cell to the original condition. Thus, the space or time required to represent a single bit can be greatly reduced as compared with the space or time required to represent a bit under the above discussed two prior systems in which two opposite changes in state are required for at least some of the bits. Also, the changes in state can then be used for self-clocking purposes.

In order to permit bits of two or more different types to each be represented as a single change in state of the record track or equipment, I provide a unique way of distinguishing between these different types of bits by shifting the occurrence of each change in state to a different time if it represents a first type of bit than if it represents a second type of bit. The decoding or playback apparatus is then designed to respond to the differences in relative timing of the various changes in state in a manner properly reading out the different types of bit. In one form of the invention, the bit cells are all of uniform length, with the changes in state occurring at different points in the cells to represent different types of bits. In another form of the invention, the bit cells may be of different lengths for different types of bits.

In the encoding portion of my apparatus, the desired selective shift of only some of the individual changes of state, relative to others of the changes representing different types of bits, may be achieved very easily and conveniently by merely introducing a delay into the circuitry for processing bits of a certain type. In the decoding portion of the apparatus, simple circuitry may be devised to examine only a predetermined portion of each bit cell, or only a certain timed interval after each change in state, to determine whether a change in state occurs during that examined portion of a cell or during that interval, and to then read out a particular predetermined type of bit if a change does occur. When no change is found in the examined period, an opposite readout indication may be given representing the opposite type of bit.

BRIEF DESCRIPTION OF THE DRAWING

The above and other features and objects of the invention will be better understood from the following detailed description of the typical embodiments illustrated in the accompanying drawings, in which.

DESCRIPTION OF THE PREFERRED EMBODIMENT

Figure 1:
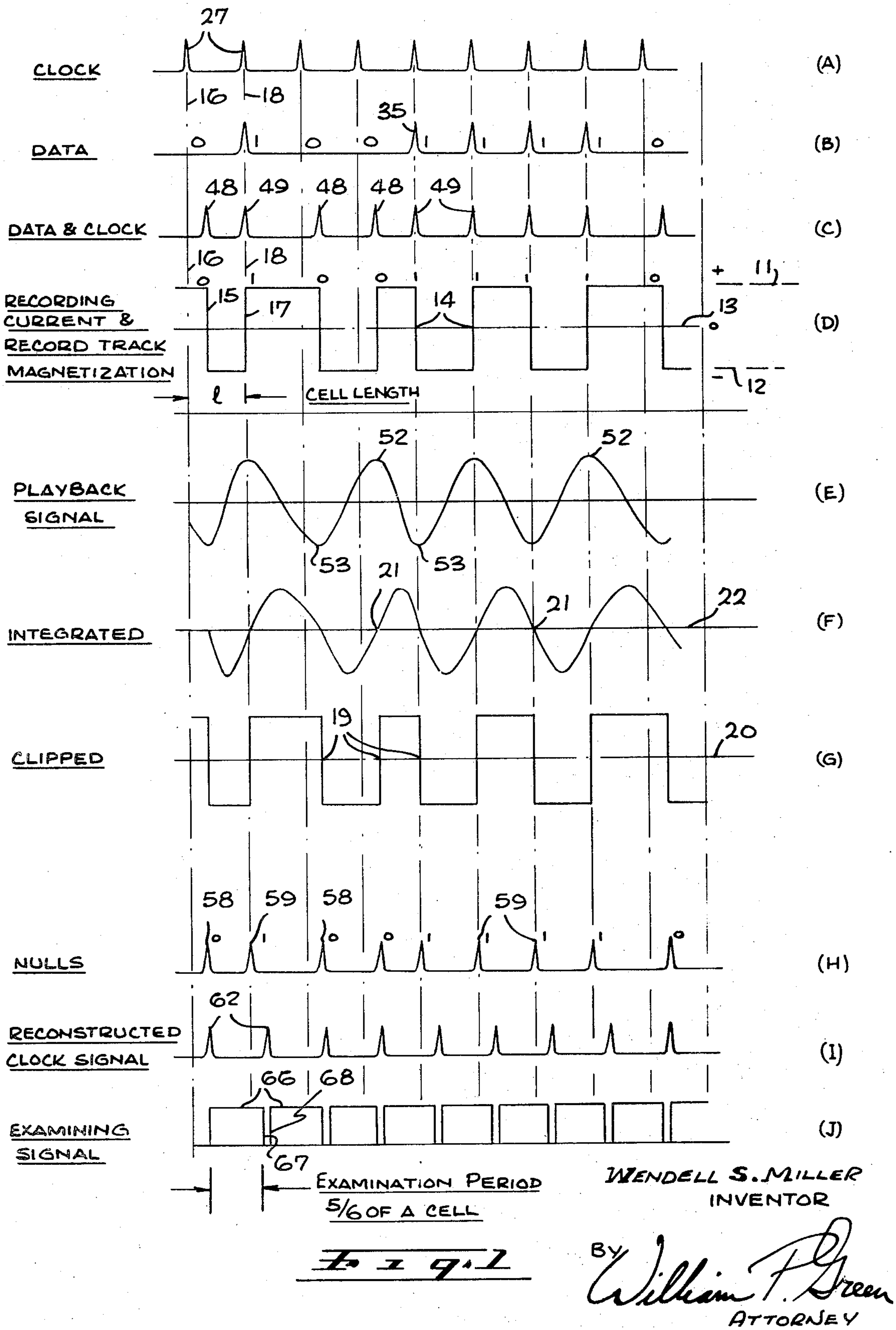
FIG. 1 shows certain wave forms which may occur in one form of recoding and playback apparatus embodying the invention.

Referring first to FIG. 1, and particularly to the curve designated (D) in that figure, that curve may be considered as representing the fluctuations in the recording or writing current which passes through the recording head of a conventional magnetic tape recorder when the recorder is being used to write a series of ones and zeros or other digits by one coding system embodying the present invention. This same curve may also be considered as representing the varying state of magnetization of the magnetic tape or other record track after it has been subjected to the recording current of curve D. The boundaries of the individual bit cells are defined by the various uniformly spaced vertical lines 16, 18, etc., defining individual cell lengths *l*. As will be apparent, the recording current fluctuates in alternating current fashion between an upper or positive level 11 at which the current flows through the recording head coil in a first direction and a lower or negative level 12 in which the current flows in the opposite direction. In changing between these two levels or states 11 and 12, the current passes through the horizontal zero current line 13, which intersects the various portions of the curve at a number of null locations 14. When the curve D of FIG. 1 is considered or treated as a record track magnetization curve, the upper level 11 represents magnetization of a particular portion of the record track in a first direction, while the level 12 represents magnetization in the opposite direction, and the null points 14 represent regions of effectively zero magnetization. The cell length *l* is then a predetermined finite dimension longitudinally along the length of the record track.

It is noted in curve D of FIG. 1 that this curve has only a single change in state, from level 11 to level 12 or vice versa, for each of the bit cell lengths *l*. For example, the first of these changes in state is represented by the first vertical line 14 of curve D, at which the writing current and record track magnetization change from the upper level 11 to the lower level 12, passing through zero line 13. To indicate that this change of state represents a data bit of a certain predetermined type, typically a zero as indicated on curve D, the change in state 15 is delayed a predetermined interval beyond the vertical line 16 which represents the beginning of the first illustrated bit cell. The next change in state is indicated by the second vertical line 17 of curve D, which extends upwardly from lower level 12 to upper level 11, and which may substantially coincide with the vertical line 18 representing the end of the first bit cell. Such coincidence of the change in state 17 with line 18 shows that this change in state represents a second and different type of bit, indicated as a one on curve D. In the remainder of curve D, it will be apparent that all zeros are represented by changes in state which are delayed or spaced the same predetermined interval beyond one of the vertical cell demarcation lines, say for example a delay interval of one-third of a cell length, while the changes in state representing ones coincide with the vertical cell demarcation lines.

The playback equipment for reading the magnetic record track which is impressed with the square wave magnetization curve D may include a conventional magnetic playback head, and is designed to respond differently to the zero-representing changes in state such as that designated 15 in curve D than to the one-representing changes in state such as that designated 17, to thus read out the zeros and ones in accordance with the relative shift between these different changes in state. The voltage and current of the playback signal produced in the readout head is illustrated by curve E of FIG. 1, which it will be apparent represents the differential of, or the rate of change of, the curve D. This signal may be passed through an appropriate filtering or integrating circuit designed to produce curve F from curve E, with the curve F being the integral of curve E and representing essentially a degraded form of the curve D, with the higher frequency components removed. The curve F may then be amplified and clipped to produce curve G, which is substantially the same as curve D. The data processing circuitry of the invention may then respond to the changes in state represented by curve G, and relative positions of those changes in state on the curve G, desirably by response to the positioning of the various null points 19 along zero line 20, to effectively and in a very positive manner read out the different digits represented. Alternatively, and with simpler circuitry, the data processing equipment may respond to the null points 21 of curve F, without the necessity for converting the curve to the clipped form shown at G, since the positioning of the null points 21 along zero line 22 of curve F is substantially the same as the positioning of null points 19 along zero line 20 of curve G.

Figure 2:
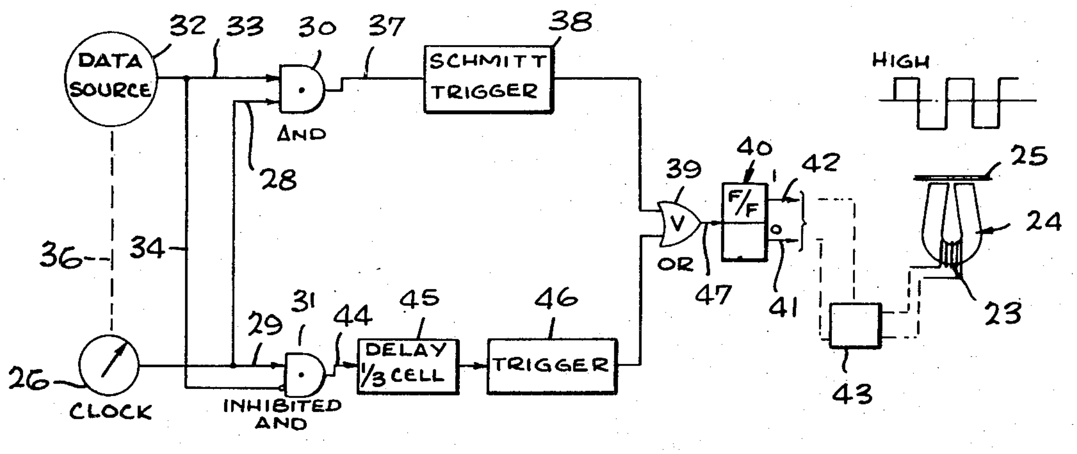
FIG. 2 illustrates diagrammatically a recording and encoding circuit embodying the invention.

Referring now to FIG. 2, I have shown in that figure diagrammatically a circuit for controlling the energization of coil 23 of a magnetic recording head 24 as a conventional magnetic recording tape 25 is advanced at a uniform rate past the recording head and from a suitable supply reel to a motor-operated takeup reel. In FIG. 2 there is represented at 26 a conventional clocking device, which produces an electrical clocking signal as shown in curve A of FIG. 1. This clocking signal provides a series of very short duration voltage and current pulses 27, occurring at regular intervals timed to define the commencement of a series of uniform length bit cells. These pulses are delivered by two lines 28 and 29 to the input side of an AND-gate 30 and an INHIBITED AND gate 31. The data bits to be recorded are supplied by a data source represented at 32, which may typically be considered as supplying an electrical pulse coincident with one of the clock pulses 27 whenever a particular incoming bit is a one, but with no pulse being supplied by source 32 when the incoming bit is a zero. These data signals are conducted to AND-circuit 30 by a line 33, and to INHIBITED AND circuit 31 by a line 34. Curve B of FIG. 1 represents the discussed signals supplied by data source 32, with the pulses which represent ones being shown at 35 in FIG. 1, and with those pulses being absent at the zero locations.

To assure that each of the data pulses 35 does in fact coincide with one of the timing pulses 27 of curve A in FIG. 1, there may be provided an appropriate control or timing connection between clock 26 and data source 32, as represented at 36 in FIG. 2, indicating that the timing of the data input pulses is preferably controlled by clock 26 to achieve the desired coincidence. When the data pulse 35 of curve B in FIG. 1 arrives from source 32 in FIG. 2, it coacts with the coinciding pulse from clock 26 to actuate AND-gate 30, and produce an output pulse in line 37 from the AND gate. This pulse may actuate a Schmitt trigger or other appropriate circuit 38 for producing a suitably conditioned signal or pulse capable of passing through OR-gate 39 and actuating a pulse triggered binary flip-flop 40 from whichever condition it is in to the opposite condition. These two conditions are communicated to coil 23 of the recording head through lines represented diagrammatically at 41 and 42 respectively in FIG 2, and through appropriate circuitry 43 for actuating the head to the upper level 11 of curve D in FIG. 1 when a pulse is provided on line 42 of FIG. 2, and to the opposite or lower condition 12 of curve D in FIG. 1 when a pulse is provided on the line 41 of FIG. 2.

Whenever a clock pulse is produced by clock 26 of FIG. 2 at a time when no pulse is received from data source 32, thus representing a zero data input bit, AND-circuit 30 is of course not actuated, but the INHIBITED AND circuit 31 is actuated to produce an output signal or pulse in line 44. This output is delayed an amount equivalent to one-third of a cell length, as by a one-shot multivibrator 45 having a built in one-third cell delay factor, with the delayed output actuating a Schmitt trigger or other circuit 46 which provides a pulse passing through the OR-circuit 39 to flip-flop 40, for actuating the flip-flop to a changed condition at a time corresponding to one-third of a cell beyond one of the vertical cell demarcation lines in FIG. 1. These delayed signals for actuating the flip-flop, as supplied to the flip-flop through line 47 of FIG. 2 from the circuit including elements 31, 45 and 46, are represented at 48 in curve C of FIG. 1, while the previously discussed pulses in line 47 to the flip-flop but from AND-circuit 30 and trigger 38 are represented at 49 in curve C. Thus, each of the delayed pulses 48 in curve C represents a zero bit, while each of the undelayed pulses 49 represents a one bit. The flip-flop 40 then utilizes these pulses of curve C to produce in recording head 24 the previously discussed recording current as represented by curve D of FIG. 1, in which curve there is a change of state from the level 11 to the level 12, or vice versa, at each of the pulses 48 and 49 in curve C.

Figure 3:
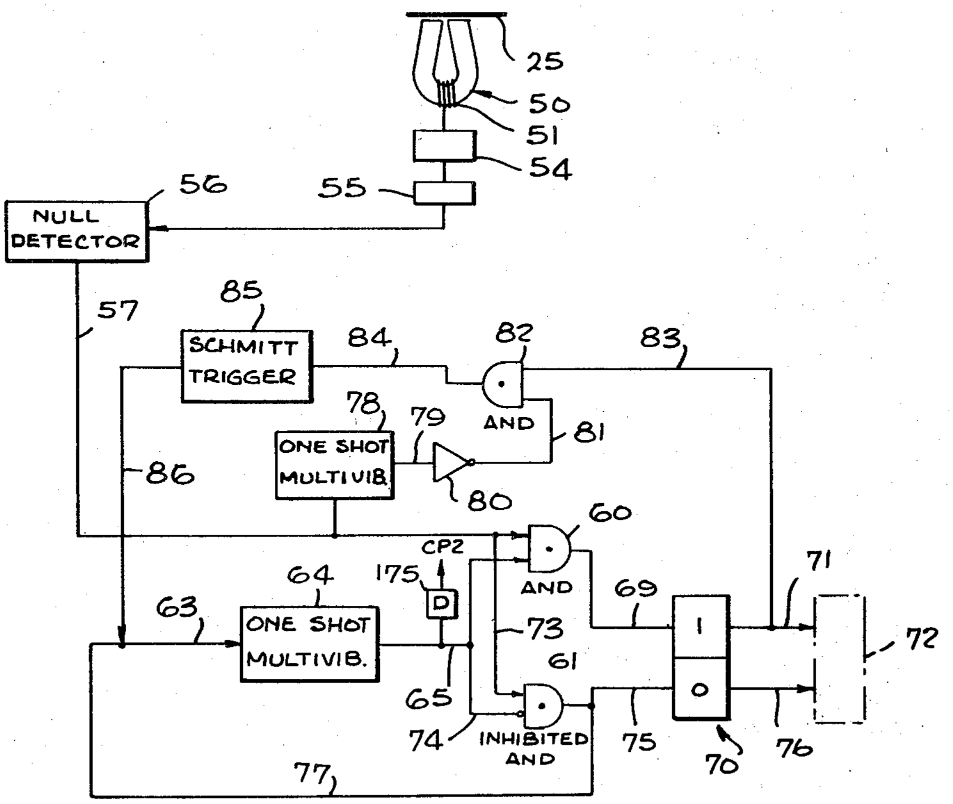
FIG. 3 is a diagram representing a playback and decoding circuit formed in accordance with the invention.

FIG. 3 is a diagram showing one type of circuit which may be utilized for reading back the magnetic signal of curve D in FIG. 1 from a tape or other record track. The tape 25 is illustrated in FIG. 3 as being advanced at a uniform rate, from a supply reel to a power driven takeup reel, and past a conventional magnetic playback or readback head 50 having a readout coil 51. As the tape advances, the varying magnetization of the tape as represented by curve D in FIG. 1 induces in coil 51 of the playback head a voltage and current having the previously discussed waveform of curve E in FIG. 1. This playback signal, as mentioned before, represents the differential of magnetization curve D, and therefore has its maximum positive current and voltage peaks 52 and its maximum negative portions 53 at locations corresponding to the vertical lines 15, 17 etc., of curve D representing the points at which the changes of magnetic state in the tape occur. Integrating circuit 54 of FIG. 3 develops from the signal of curve E in FIG. 1 the alternating voltage and current signal represented by curve F in FIG. 1, which has its peaks and valleys positioned substantially in correspondence with the peaks and valleys of the recording current and record track magnetization curve D, and which also has its null points 21 located in correspondence with the positioning of the null points 14 of curve D. Preferably, the signal of curve F is greatly amplified, and clipped, by the circuit 55 of FIG. 3, to produce the square wave alternating current voltage and current signal of curve G in FIG. 1, which is identical with curve D in all essential respects.

The curve G signal is fed to a null detector 56, which detects each of the points 19 in curve G at which the voltage and current of that signal pass the zero line 20, and which produces in line 57 of FIG. 3 electrical voltage and current pulses at each of those null points. These pulses in line 57 are shown in curve H of FIG. 1, which is a reconstruction of the original combined data and clock signal used in recording and illustrated in curve C. In curve H, each of the pulses 58 representing a zero data bit is delayed slightly in time (one-third of a cell length) with respect to the pulses 59 representing ones.

The pulses of curve H are fed into the input sides of an AND-gate 60 and an INHIBITED AND gate 61. For comparison with the pulses of curve H, the circuitry of FIG. 3 reconstructs a clock signal, such as the one typically illustrated in curve I of FIG. 1, having timing pulses 62 spaced in correspondence with the pulses 27 of the original clock signal illustrated in curve A. This clock signal of curve I is produced in a manner later to be discussed within the line designated 63 in FIG. 3, and may be in any of different timed relationships with respect to the data pulses of curve H, but is typically illustrated as having peaks 62 of the reconstructed clock signal coincident with the peaks 58 of curve H which represent zeros, and delayed one-third of a cell length with respect to the peaks 59 which represent ones. These clock pulses of curve I are fed to a one-shot multivibrator 64, which is enabling in character, and responds to each pulse by producing in line 65 leading to gates 60 and 61 an extended and self-terminating examination pulse represented at 66 in curve J of FIG. 1. Each of these voltage and current pulses 66 of curve J commences at the time of a corresponding one of the clock pulses 62 of curve I, and continues through an examination period equaling five-sixths of a cell length, after which the pulse drops off at 67 in curve J until initiation of the next successive pulse at 68 by the next clock pulse of curve I.

Whenever a pulse 59 of curve H, representing a one, comes in on line 57 from null detector 56 during one of the examination periods represented by a pulse 66 of curve J, these two pulses together actuate AND gate 60 to produce an output in line 69 of FIG. 3 serving to actuate a pulse triggered binary flip-flop 70 to its one-indicating state, in which it produces an output signal in the form of a predetermined level on line 71 indicating to a computer circuit or other output circuit 72 the reading of a one on the tape. A delayed clock pulse CP2 for use in computer 72 may be taken from line 65 through a delay circuit 175. The pulses in line 57 which represent zeros, on the other hand, do not occur during the examination period but rather serve to commence one of the examination periods, and therefore will not coact with a pulse 66 in a manner actuating AND-circuit 60. Such zero representing pulses in line 73 of FIG. 3 will, however, respond to the absence of a pulse in line 74 to actuate the INHIBITED AND circuit 61 in a manner producing an output in line 75 to the zero-actuating control input side of flip-flop 70. The resulting actuation of the flip-flop to its zero indicating position, produces an output signal in line 76 leading to unit 72, and representing the reading out of a zero.

To discuss now the manner in which the clock signal of curve I in FIG. 1 is reconstructed in line 63 of FIG. 3, it is noted that whenever a pulse from line 57 passes through INHIBITED AND gate 61, the output in line 75 is communicated through line 77 directly back to the input side 63 of multivibrator 64, to thereby provide clock pulses 62 whenever the readout from the circuit is a zero. When the readout is a one, the corresponding pulse 59 of curve H is delayed in time for a period corresponding to one-third of a cell, by passage through a one-shot enabling multivibrator 78 (FIG. 3), which produces an output pulse or signal in line 79 commencing at the time of receipt of the pulse 59 of curve H, and continuing through an accurately timed one-third cell delay. Inverter 80 reverses the condition of the signal in line 79, and produces in line 81 leading to AND circuit or gate 82 a signal which commences one-third of a cell after each pulse 59 of curve H, and continues until multivibrator 78 is once again actuated by the next pulse 59 received from line 57. The pulse 59 also acts through gate 60 and flip-flop 70 to raise the level on line 71, and feed this signal back through line 83 to AND-gate 82, at which the signal combines with the delayed rise in level of line 81 after the expiration of exactly one-third of a cell from the time of arrival of the actuating pulse 59 in line 57, to thereby produce in line 84 of FIG. 3 an output signal (rise in level) whose commencement is delayed exactly one-third of a second with respect to the input pulse 59, and which may then actuate a Schmitt trigger 85 to produce in line 86 a corresponding one of the clocking pulses 62 of curve I. In this way, each of the input pulses from null detector 56 acts to produce a properly timed corresponding one of the pulses 62 of the reconstructed clock signal of curve I.

To summarize very briefly the operation of the recording and playback apparatus of FIGS. 2 and 3, the recording equipment of FIG. 2 serves to produce a recording current and record track magnetization as illustrated in curve D of FIG. 1, and in which each change of state from level 11 to level 12, or vice versa, represents a single data bit, with the changes in state which represent zeros being delayed one-third of a cell with respect to the changes in state which represent ones. The recording apparatus of FIG. 3 reproduces the square wave of curve D, as illustrated in curve G of FIG. 1, and by responding to the nulls of curve G produces the curve H signal in which the pulses 58 representing zeros are delayed with respect to the pulses 59 representing ones. By then comparing the pulses 58 and 59 with the examination signal of curve J, the gates 60 and 61 of FIG. 3 differentiate between the zero and one pulses of curve H to produce zero and one outputs in lines 76 and 71 respectively.

If desired, the amplifier and clipper circuit 55 of FIG. 3 can in some instances be deleted, with null detector 56 responding directly to the nulls 21 of curve F, which it is noted are located substantially in correspondence with the nulls 19 of curve G. It is also pointed out that instead of employing the integrator 54, amplifier and clipper 55, and null detector 56, an appropriate peak responsive circuit can be employed for producing pulses directly from the curve E signal from coil 51 (typically amplified), and representing the maximum positive and negative points 52 and 53 of that differential curve, which points represent the regions of maximum change of the magnetization on the tape, and therefore coincide substantially with the null points 21 and 29 of curves F and G.

Figure 4:
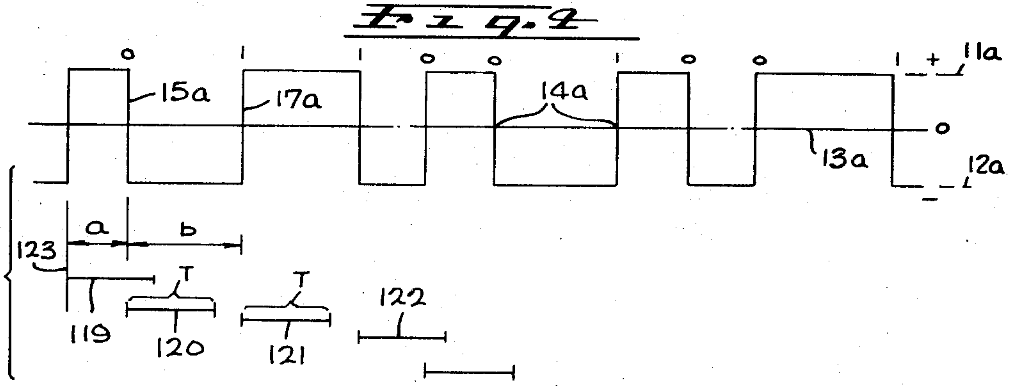
FIG. 4 shows another type of coded wave pattern which may be produced by equipment embodying the invention.
Figure 5:
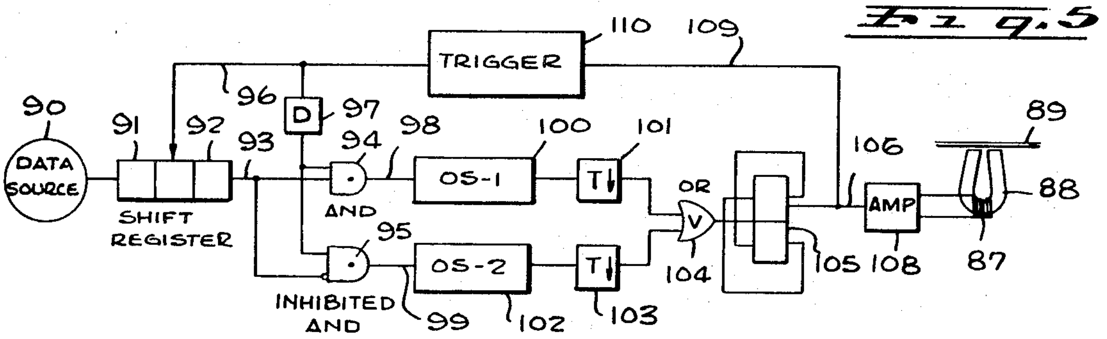
FIG. 5 shows a recording circuit for producing the wave pattern of FIG. 3.
Figure 6:
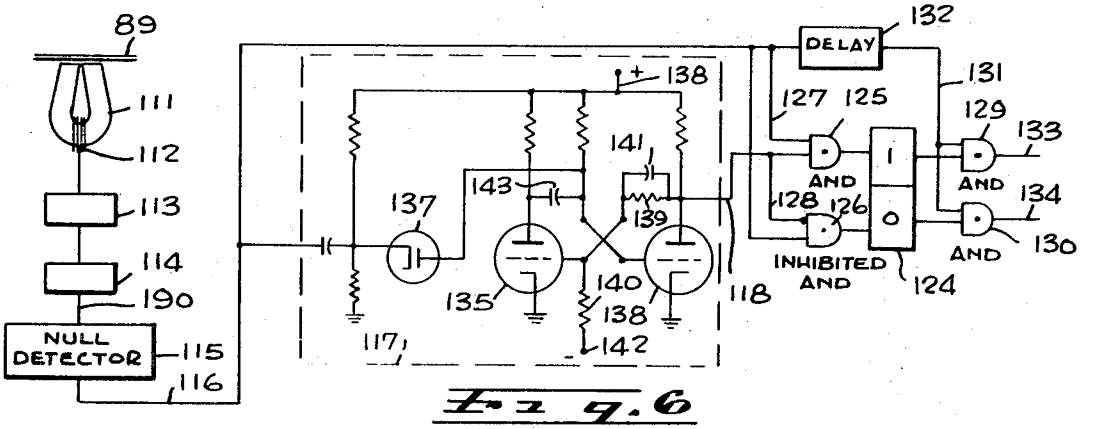
FIGS. 6 and 7 show two different decoding or playback circuits for reading back a tape recorded in the apparatus of FIG. 5.

FIG. 4 shows a curve similar to curves D and G of FIG. 1, and representing a variational coding pattern embodying the invention. A tape recording system for coding a series of data bits in accordance with the curve of FIG. 4 is represented in FIG. 5, while a playback system for responding to the coded signals of the FIG. 4 curve is illustrated in FIG. 6. In consistency with the extended description of the first form of the invention, the FIG. 4 curve may be considered as representing the alternating positive and negative electrical voltage and current in coil 87 of recording head 88 in FIG. 5 (as in curve D of FIG. 1), as well as the alternating magnetic polarity of the record track on tape 89, and the integrated and clipped voltage and current curve of the playback signal occurring at 190 in FIG. 6 and corresponding to curve G of FIG. 1. It is also of course contemplated that, in equipment in which there is no actual recording and then playback of the coded signals, the curve of FIG. 4 may represent the changes in state of a coded signal which represents a series of data bits and which is decoded substantially immediately without recording, as in pulse code modulation telephone circuitry.

In FIG. 4, as in curves D and G of FIG. 1, each of the vertical lines 15*a*, 17*a*, etc., represents a change in electrical state, magnetic state, or the like, as from the upper level 11*a* of FIG. 4 to the lower lever 12*a* of FIG. 4, and preferably through the zero level 13*a* at which nulls 14*a* occur. The code significance or meaning of each change in state as a representation of a particular data bit is written into the curve of FIG. 4 in the form of a controlled timed interval between that particular change of state and the preceding change of state. For example, the significance of the change of state designated 15*a* in FIG. 4 is determined by the time interval *a* between that change of state and the preceding change, which may typically indicate that the data bit represented by change 15*a* is a zero. The next successive change of state 17*a* in FIG. 1 occurs a greater time interval *b* following the change 15*a*, to indicate that change 17*a* has a different meaning, typically representing a one in the coding system. Similarly, in the remainder of the FIG. 4 curve, each of the changes in state which follows the preceding change by an interval of the length *b* represents a one, while each change which is spaced only the short interval *a* from the preceding change is a zero. Thus, there is no necessity in FIG. 4 for a clock pulse of the type illustrated in curve A of FIG. 1. The various bit cells in this FIG. 4 coding system are of two different lengths corresponding to the timing or tape length represented by the intervals *a* and *b* respectively.

In the encoding and recording apparatus of FIG. 5, for producing the coded signal of FIG. 4, the input data signals representing ones and zeros are supplied by a data source 90, which feeds the signals sequentially into a series of successive positions within a shift register 91. When a particular data bit or signal is in the final position 92 of shift register 91, this bit produces an output in line 93 corresponding to the logical value or significance of the bit at position 92, with this output signal being delivered to an AND-circuit 94 and an INHIBITED AND circuit 95. As an example it may be assumed that when the bit located in position 92 of the shift register is a one, a positive electrical output signal is delivered through line 93 to circuits 94 and 95, but with that signal being interrupted when the bit represented at 92 is a zero. The various bits are advanced progressively from left to right in shift register 92, with one rightward advancement occurring each time that a trigger signal is delivered to the shift register through line 96. The manner of development of this trigger signal will be discussed at a later point. Immediately following the application of each such trigger signal to the shift register, after a very short delay interval just sufficient to assure proper advancement of the bits within the shift register by the trigger signal, a delay circuit 97 delivers examination pulses to the gate circuits 94 and 95 to examine the condition of the shift register and actuate circuits 94 and 95 in accordance with the significance of the bit within final position 92 in the register. That is, if the bit at location 92 is a one, the examination pulse from delay circuit 97 will combine with the signal in line 93 to actuate AND-circuit 94 and produce an output in line 98. Conversely, if the bit at location 92 is a zero, the absence of a signal in line 93 will combine with the presence of a pulse from delay circuit 97 to actuate INHIBITED AND circuit 95, and produce an output in line 99. A one-indicating pulse in line 98 actuates a first one-shot multivibrator 100, from a first normal state to a second changed state, and after a predetermined delay interval determined by the circuitry of the multivibrator, the latter automatically returns to its normal state, and on such return actuates a trigger circuit 101 which is designed to respond to the returning condition of the multivibrator. Similarly, each zero-indicating pulse in line 99 actuates a second one-shot multivibrator 102, which has a shorter built-in delay interval before it automatically returns to its original condition, with that return serving to actuate a trigger 103. The delay built into multivibrator 100 is just sufficient to cause an output pulse from trigger 101 after a period corresponding to the timed delay interval represented at *b* in FIG. 4 following receipt of the trigger pulse in line 96. The delay built into multivibrator 102 causes the output from trigger circuit 103 to be delayed the shorter period represented at *a* in FIG. 4 following receipt of a corresponding trigger pulse in line 96.

The outputs from trigger circuits 101 and 103 are fed into an OR-circuit 104, which produces an output serving to actuate a J-K flip-flop 105 to a changed one of its two conditions each time that a signal is received by the OR circuit from either of the triggers 101 or 103. When the flip-flop is in its upper condition, it may deliver a positive electrical signal to an amplifier 108 through an output line 106, and when the flip-flop is in its lower condition it may deliver a negative signal to the amplifier, with the latter amplifying these signals and producing in coil 87 of recording head 88 an alternating square wave potential and current curve of the form shown in FIG. 4. The head then records a similar magnetization curve on tape 89, with the horizontal distances along the curve in FIG. 4 then representing distances longitudinally along the record track. Each time the flip-flop 105 is actuated, the change in output in line 106 is fed back through a line 109, and serves to actuate a trigger 110 for producing one of the previously mentioned triggering pulses within line 96 for shifting register 92 to the next successive position.

From the above discussion, it will be apparent that, each time that the leading or right-hand data bit within shift register 92 is a one, multivibrator 100 and the related circuitry (including delay unit 97) introduce a predetermined relatively long delay, such as that represented *b* in FIG. 4, between the change of state in FIG. 4 representing that bit, and the preceding change of state in the curve. When the significant or right-hand bit in register 92 is a zero, multivibrator 102 and the related circuitry introduce a shorter delay period *a* (typically one-half the length of interval *b*) between the corresponding change of state and the preceding one.

The circuitry of FIG. 6 represents a playback and decoding unit for reading the coded signals on tape 89 and decoding them to a form representing the original one and zero bits. As in the apparatus of FIG. 3, the playback equipment of FIG. 6 includes a playback head 111, whose coil 112 delivers a differential-type signal to integrator 113 and clipper 114, to reproduce the curve of FIG. 4 in the line 190 of FIG. 6. Null detector 115, corresponding to null detector 56 of FIG. 3, then produces pulses in line 116 to a multivibrator circuit 117, with these pulses occurring at the locations of the changes in state of FIG. 4, all in a manner very similar to the production of the null pulses of curve H in FIG. 1.

The multivibrator 117, a typical circuit for which is illustrated in some detail in the broken line box of FIG. 6, is a one-shot multivibrator having a "type-2" delay characteristic. That is, the multivibrator produces in its output line 118 a series of electrical signals (in the form of a predetermined output level from the multivibrator), with one of these signals commencing a predetermined timing interval "T" each time that a null indicating pulse in line 116 is fed into the input side of the multivibrator. A series of these signals are represented diagrammatically at 119, 120, 121, 122, etc., in FIG. 4. The duration of the time interval T measured by the individual signals is greater than the time interval *a* of FIG. 4, and less than the time interval *b*. Thus, the first signal 119 of FIG. 4 commences at 123, at the time of one of the changes in state of the square wave curve, and is still continuing at the time of the next successive change in state designated 15*a* in FIG. 4. The circuitry of FIG. 6 responds to the fact that signal 119 is still continuing at the time of the change of state 15*a*, to indicate a zero in the two stable state flip-flop 124 of FIG. 6. The second signal 120 in FIG. 4 commences a new timing period starting at the change in state designated 15*a* in that figure, and maintains the multivibrator at its actuated signalling level for the period T beyond point 15*a*. Thus, the signals 119 and 120 in effect overlap and merge together to maintain the multivibrator at its actuated level continuously from point 123 to the end of signal 120. Because of the increased spacing between changes 15*a* and 17*a*, the signal 120 ends before change 17*a* occurs, which fact is indicated by actuation of flip-flop 124 of FIG. 6 to its upper one-indicating state.

For achieving this purpose of determining whether or not each of the signals in line 116, representing changes in state of the curve of FIG. 4, occurs before or after termination of the timing interval T which was commenced by the preceding change in state of the FIG. 4 curve, the output in line 118 is delivered to an AND-gate 125 and an INHIBITED AND gate 126, and is there combined with the signals in line 116, delivered through lines 127 and 128, to actuate flip-flop 124 to its one-indicating state if AND-circuit 125 shows that the timed signal in line 118 is still continuing when the next signal in line 116 is received, and to actuate the flip-flop to its zero-indicating state if the INHIBITED AND circuit 126 shows that the timed signal from line 118 has ended before receipt of the next input pulse in line 116. The bits indicated by flip-flop 124 can be read out by a pair of AND-circuits 129 and 130, which combine the outputs from the upper and lower sides respectively of the flip-flop with a readout signal 131 from a delay circuit 132, which produces the readout pulses in very slightly delayed relation to the input pulses in line 116, the delay period of unit 132 being substantially less than the smallest interval *a* of FIG. 4, so that the condition of flip-flop 124 is read out into output lines 133 and 134 after each change in state of the curve of FIG. 4, and before the next successive change in state.

To describe now the circuitry of the plate-coupled monostable multivibrator 117 of FIG. 6, this multivibrator includes two vacuum tubes 135 and 136, the latter of which is normally conducting and the former of which is normally cut off, until a negative trigger signal is applied from line 116 through diode 137 to the grid of tube 136, in a value sufficient to cause tube 136 to become nonconducting. As tube 136 becomes nonconducting, the plate voltage of that tube rises from the previous value to a value corresponding to the potential of the positive power supply lead 138. This increase in voltage at the plate of tube 136 causes an increase in the potential of the grid of tube 135, which is connected to an intermediate point in a voltage divider circuit including resistors 139 and 140, and capacitor 141, the lower end of which circuit is connected at 142 to a negative grid biasing potential. The flow of plate current through tube 135 drops the plate voltage of that tube to a value determined by the plate load and grid bias. When tube 135 conducts, the plate voltage drop of that tube is coupled through capacitor 143 to the grid of tube 136 causing the latter to remain in the nonconducting condition. The voltage at the grid of tube 136 immediately starts to increase exponentially toward the supply voltage at 138. As soon as the cutoff bias of tube 136 is reached, that tube again begins to conduct and its plate voltage drops, with the result that a regenerative switching action takes place increasing the negative potential of the grid of tube 135 and terminating the conduction of that tube. This condition is maintained until another negative trigger pulse is received from input line 116. If the next successive trigger pulse in line 116 arrives before the regenerative switching action has terminated the period of conduction of tube 135 and returned tube 136 to its conducting condition, the second negative input pulse is communicated directly to the grid of tube 136 to recommence the timing period, and prevent return of the tubes to their original condition until an interval such as that represented at 119 or 120 in FIG. 4 has expired following receipt of the latest pulse on line 116. Thus, each input pulse in line 116 commences a new timed output pulse in line 118 from the multivibrator, regardless of which condition the multivibrator was in at the time of arrival of the pulse in line 116. In this way, each of the changes of state 15*a*, 17*a*, etc., in FIG. 4 commences a timed pulse 119, 120, 121 or the like in line 118 of FIG. 6, which pulse is compared with the next pulse received on line 116 to determine whether the pulse 119 or the like produced by a particular change in state is still continuing at the time of occurrence of the next change of state, to thereby determine whether the apparatus of FIG. 6 reads out a one or a zero for a particular change in state. An example of another typical multivibrator circuit which has a type two delay characteristic and which may be used at the location of multivibrator 117 in FIG. 6 is disclosed in U.S. Pat. No. 2,863,052, issued Dec. 2, 1958 on "Electronic Pulse Timing System."

Figure 7:
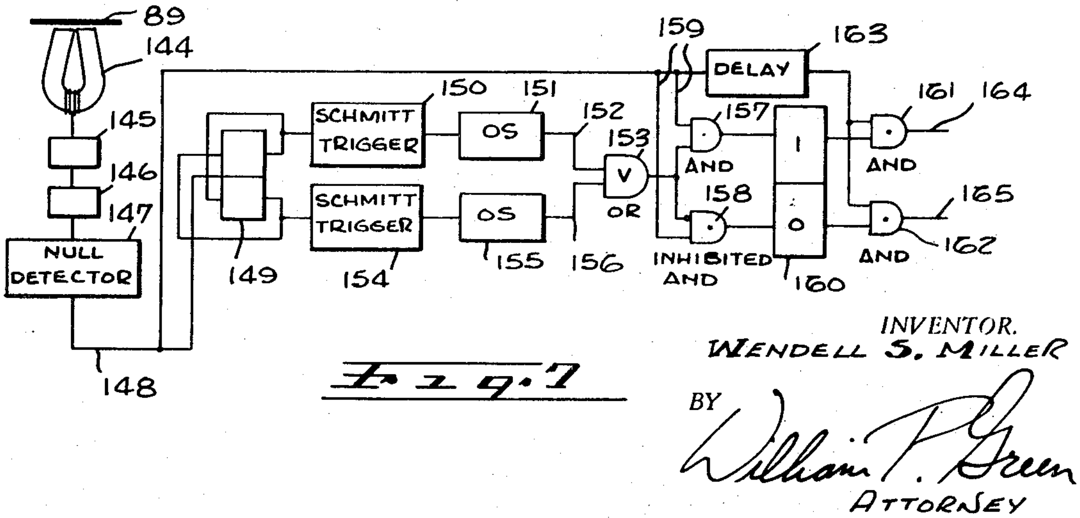

FIG. 7 shows another decoding or playback circuit which may be utilized in lieu of the circuit of FIG. 6, for reading back the coded information carried by a magnetic recording tape 89. The playback head 144 and its associated integrating circuit 145, chopping circuit 146 and null detector 147 may be identical with the corresponding units 111, 113, 114 and 115 of FIG. 6, to produce in line 148 a series of pulses occurring at the locations of, and produced by, the changes in state 15*a*, 17*a*, etc., of the FIG. 4 curve. These pulses representing the changes in state of the FIG. 4 curve are delivered to a J-K flip-flop 149 in FIG. 7, so that each pulse acts to switch the flip-flop from its prior condition to the opposite condition. Actuation of the flip-flop to its upper or high state delivers a signal to a Schmitt trigger circuit 150, which actuates a one-shot multivibrator 151, which stays in its actuated or high state for a predetermined delay interval corresponding to the periods designated 119, 120, 121 etc., in FIG. 4. Multivibrator 151 produces in its output line 152 a pulse which continues so long as the multivibrator is in its actuated state, and therefore delivers to OR-circuit 153 a pulse of the duration of one of the pulses 119, 120, etc., of FIG. 4. Similarly, when the flip-flop 149 is actuated to its lower state in FIG. 7, the output from that lower state causes a Schmitt trigger circuit 154 to actuate a one-shot multivibrator 155 identical with multivibrator 151, in a manner producing in line 156 to OR-circuit 153 a pulse such as that designated at 119, 120, 121 etc., in FIG. 4. The OR-circuit 153 delivers these pulses 119, 120, 121, etc., commencing at the time of each of the changes in state of the square wave curve in FIG. 4, to an AND-circuit 157 and an INHIBITED AND circuit 158, in which the output from OR-circuit 153 is compared with the original pulse in line 148, delivered to the gates 157 and 158 through lines 159. In this way, an output from AND-circuit 157 to two stable state flip-flop 160 actuates that flip-flop to its one-indicating condition if a particular signal in line 148, representing a particular change in state of the FIG. 4 curve, occurs during one of the pulses 119, 120, etc.; while INHIBITED AND circuit 158 actuates flip-flop 160 to its lower or zero-indicating state when a particular pulse in line 148, indicating a change in state in the curve of FIG. 4, occurs after termination of the pulse 119, 120, etc., initiated by the preceding change of state of the FIG. 4 curve. The readings of flip-flop 160 are read out by two AND-circuits 161 and 162 and a delay circuit 163, corresponding to AND-circuits 129 and 130, and delay circuit 132, of FIG. 6, to produce pulses in output lines 164 and 165 representing the ones and zeros, or other data bits originally recorded on tape 89.

While certain specific embodiments of the present invention have been disclosed as typical, the invention is of course not limited to these particular forms, but rather is applicable broadly to all such variations as fall within the scope of the appended claims. For example, as previously indicated, the invention can of course be applied to apparatus which utilizes a record track of other than magnetic material, or can be applied to data coding and decoding apparatus in which there is no recording step between the coding and decoding equipment. With reference to other types of record tracks which may be used, the track may in some instances typically be optical in character, with the data bits being recorded by varying the light transmission characteristics of the track, and with the readout equipment responding to those variations by actuation of a photoelectric cell or the like. Similarly, the record track may be of a character in which different types of bits are recorded by giving the track different electrical conductance characteristics at the locations of different bits, with means being provided for reading out the variations in conductance, either by directly contacting the conductive portion of the tape or other record track with electrical conductors, or by passing those portions successively past capacitor plates which sense the presence of the conducting material capacitively. Such a conductance responsive system is disclosed and claimed in my copending application Ser. No. 811,716, filed Apr. 1, 1969, entitled "Electrical Recording And Playback Apparatus." It is also contemplated that the significant changes in state which are utilized to represent the data bits in coded form may be produced by use of alternating current signals of different frequencies, or by controllably changing the frequency modulation of a carrier wave, as between an unmodulated state and one or more states of modulation by different frequencies.

Where the present description has discussed various signals as typically representing numeric digits, such interpretation is of course not essential to the invention, and the signals are obviously capable of interpretation also as logical yes-no valued functions, or as signals requiring subsequent values to be the same as or different from the preceding values or as having other conventional interpretations. As used in the claims, the term "bit" refers to such signals, however interpreted.

When it is desired to use the present apparatus in a nonrecording installation in which the coded signal is immediately decoded without recording, as in the telephone transmission system, the coded signals of FIG. 2 are fed directly to the decoding apparatus of FIG. 3, or the coded information of FIG. 5 is fed directly into the decoding apparatus of FIG. 6 or FIG. 7. For example, the output from amplifier 43 in FIG. 2, carrying the coded information represented in curve D of FIG. 1, may be fed directly into null detector 56 of FIG. 3. Similarly, the output of amplifier 108 in FIG. 5 may be delivered directly to null detector 115 of FIG. 6 or null detector 147 of FIG. 7. These arrangements will of course be apparent without complicating the drawings with additional figures.

For simplicity of illustration and description, the particular forms of the invention shown in the drawings are typically designed to handle only two different types of data bits, such as ones and zeros, or the like. When more than two types of bits are to be coded and/or decoded, appropriate portions of the circuitry may obviously be duplicated as necessary to introduce additional distinctive timing characteristics for the other types of bits. For example, in FIG. 4, a third delay interval longer than either interval *a* or interval *b* may be utilized between successive changes in state to represent a third type of data bit, with the coding and decoding circuitry functioning to produce and respond to this third interval in a manner appropriately differentiating it from intervals *a* and *b*.

I claim:

1. Data processing apparatus comprising input means for receiving a data bit stream including a series of successive data input signals representing digital data bits of two or more different significances; data output means for representing said stream of digital bits in coded form and adapted to be actuated between a plurality of different significant states; and coding means responsive to said input signals and acting while in continuous operation to produce a series of changes in state of said output means at the rate of a single change in significant state, from one of said states to another without return, for each bit in said stream having any of said significances; said coding means being operable, in representing two successive bits of said stream having the same significance, and also in representing two successive bits of said stream having different significances, to end one bit and commence the next in the same one of said states; said coding means being operable to distinguish between said bits of different significance by shifting the occurrence of the corresponding change in state to a slightly different time if it represents a bit of a first significance than if it represents a bit of a second significance.

2. Data processing apparatus as recited in claim 1, in which said output means include means for recoding said changes in state on a record track as corresponding changes in state of the track which are shifted slightly longitudinally of the track to distinguish between said bits of different significance.

3. Data processing apparatus as recited in claim 1, in which said coding means include clock means for providing a series of regularly timed clocking signals, and means for producing from said clocking signals and from said stream of successive data input signals a series of combined control signals which actuate said output means and are timed irregularly to effect said shift in occurrence of changes in state representing a bit of said first significance relative to changes in state representing a bit of said second significance.

4. Data processing apparatus as recited in claim 1, in which said coding means are operable for each of said successive bits of said stream to change said output means between two opposite significant states and through a null condition and to shift the occurrence of said null condition to a different time for a bit of said first significance than for a bit of said second significance.

5. Data processing apparatus as recited in claim 1, in which said coding means include clocking means for timing a series of bit cells of uniform length, and means for producing said changes in state representing bits of different significance at different times within said uniform length cells.

6. Data processing apparatus as recited in claim 1, in which said coding means include means for timing each of said changes in state to occur a controlled time after the preceding change in state, and regulating the time between successive changes to be longer for bits of one significance than for bits of another significance.

7. Data processing apparatus as recited in claim 1, including decoding means responsive to said changes in state to produce a series of output signals representing said stream of data bits in decoded form.

8. Data processing apparatus as recited in claim 1, including decoding means responsive to said changes in state to produce a series of output signals representing said stream of data bits in decoded form, said decoding means being operable to distinguish between said bits of different significance by indicating a different type of bit if a particular change in state occurs at one time than if the same change in state is shifted slightly, less than one bit cell, to a different time.

9. Data processing apparatus as recited in claim 1, including decoding means responsive to said changes in state to produce a series of output signals representing said stream of data bits in decoded form, said decoding means being operable to distinguish between said bits of different significance by indicating a bit of different significance if a particular change in state occurs at one time than if the same change in state is shifted slightly, less than one-bit cell, to a different time, said decoding means being adapted to respond differently to changes in state which occur within any of a series of timed examination intervals than to changes which occur within periods between said intervals to thereby distinguish between said bits of different significance.

10. Data processing apparatus as recited in claim 1, including decoding means responsive to said changes in state to produce a series of output signals representing said stream of data bits in decoded form, said decoding means being operable to distinguish between said bits of different significance by indicating a bit of different significance if a particular change in state occurs at one time than if the same change in state is shifted slightly, less than one bit cell, to a different time, said decoding means including means for timing a predetermined interval following each of said changes in state and producing a different output signal if the next significant change of state occurs within said interval than if it occurs after said interval to thereby distinguish between said bits of different significance.

11. A record track having recorded thereon a data bit stream including a series of successive digital data bits of different significances with each bit in said stream recorded as a single significant change in state of the track from one state to another without return; said changes in state, in representing two successive bits of the same significance, and also in representing two successive bits of different significances, being so recorded as to end one bit and commence the next in the same one of said states; said bits of different significance being distinguished one from another by a shift in each of said single significant changes in state to a different location longitudinally of the track if it represents a bit of a first significance than if it represents a bit of a second significance.

12. A record track as recited in claim 11, in which said track changes between two opposite states and through a null condition at each of said bits.

13. A record track as recited in claim 11, in which said track is a magnetic record track and changes between opposite magnetic polarities and through a null condition at each of said bits.

14. Data processing apparatus comprising input means adapted to represent in coded form a data bit stream including a series of successive digital data bits of two or more different significances, said input means being actuable between a plurality of different significant states; output means for producing a series of output signals representing said stream of digital data bits in decoded form; and decoding means responsive to said changes in state of said input means between said different significant states and acting while in continuous operation to actuate said output means to produce output signals representing said bits at the rate of one digital bit for each change in significant state of said input means, from one of said states to another without return; said decoding means being operable, when decoding two successive bits in said stream having the same significance, and also when decoding two successive bits in said stream having different significances, to actuate said output means to produce output signals representing said successive bits in response to two successive changes in state of said input means one of which ends and the second of which commences at the same state; said decoding means being operable to distinguish between said bits of different significance by indicating a bit of different significance if a particular change in state occurs at one time than if the same change in state is shifted slightly, less than one bit cell, to a different time.

15. Data processing apparatus as recited in claim 14, in which said input means include a record playback unit operable to respond to a series of changes in state of a record track to actuate said input means between said different significant states thereof.

16. Data processing apparatus as recited in claim 15, in which said input means are actuable for each bit between two opposite states and through a null condition, said decoding means being responsive to the occurrence of said null condition for each bit to distinguish between said bits of different significance.

17. Data processing apparatus as recited in claim 15, in which said decoding means include means for comparing the timing of said changes in state with the timing of a clocking signal to determine whether or not the changes in state representing individual ones of said bits have been shifted.

18. Data processing apparatus as recited in claim 15, in which said decoding means include means for reconstructing a clocking signal from information derived by said decoding means from said input means; and means for comparing the timing of said changes in state with the timing of said clocking signal to determine whether the changes representing individual ones of said bits have been shifted.

19. Data processing apparatus as recited in claim 14, in which said decoding means are adapted to respond differently to changes in state which occur within any of a series of timed examination intervals than to changes which occur within periods between said intervals to thereby distinguish between said bits of different significance.

20. Data processing apparatus as recited in claim 14, in which said decoding means include means for timing a predetermined interval following each of said changes in state and producing a different output signal if the next significant change of state occurs within said interval than if it occurs after said interval to thereby distinguish between said bits of different significance.

2. Data processing apparatus comprising input means for receiving a series of data input signals representing digital data bits of two or more different types; data output means for representing said digital bits in coded form and adapted to be actuated between a plurality of different significant states; and coding means responsive to said input signals and acting while in continuous operation to produce a series of changes in state of said output means at the rate of a single change in significant state, from one of said states to another without return, for each bit of any type; said coding means being operable, in representing two successive bits of the same one of said types, and also in representing two successive bits of different types, to end one bit and commence the next in the same one of said states; said coding means being operable to distinguish between said different types of bits by shifting the occurrence of the corresponding change in state to a slightly different time if it represents a bit of a first type than if it represents a bit of a second type, said coding means including clocking means for providing a series of regularly timed clocking signals, said output means including a flip-flop circuit actuable between two different conditions representing said different states of the output means respectively, first gating means responsive to one of said clocking signals to actuate said flip-flop if a data input signal representing one type of bit is received, and additional gating means responsive to one of said clocking signals to actuate said flip-flop in delayed relation thereto if a data input signal representing a different type of bit is received.

22. Data processing apparatus as recited in claim 21, including a magnetic recording head controlled by said flip-flop and operable to produce changes in magnetic state of a magnetic record track corresponding to changes in state of said flip-flop and which are shifted slightly longitudinally of the track to distinguish between said different types of bits.

23. Data processing apparatus comprising input means for receiving a series of data input signals representing data bits of two or more different types; data output means for representing said bits in coded form and adapted to be actuated between a plurality of different significant states; and coding means responsive to said input signals and acting while in continuous operation to produce a series of changes in state of said output means at the rate of a single change in significant state, from one of said states to another without return, for each bit of any type; said coding means being operable to distinguish between said different types of bits by shifting the occurrence of the corresponding change in state to a slightly different time if it represents a bit of a first type than if it represents a bit of a second type; said output means including a flip-flop circuit actuable between two different conditions representing said different states of the output means respectively, and two different delay circuits responsive to input signals representing said two types of bits respectively and each operable to actuate said flip-flop from one state to another after a delay interval following receipt of an input signal; one of said circuits having a longer delay interval than the other to produce a shorter delay between actuations of the flip-flop for one type of bit than for another type.

24. Data processing apparatus as recited in claim 23, including a magnetic recording head controlled by said flip-flop and operable to produce changes in magnetic state of a magnetic record track corresponding to changes in state of said flip-flop and which are shifted slightly longitudinally of the track to distinguish between said different types of bits.

25. The method that includes changing of unit between two or more different significant states a number of times to represent in coded form a data bit stream including a series of successive digital data bits having two or more different significances; controlling said changes in state so that in representing a series of successive bits there is a single significant change in state, from one state to another without return, for each bit in said stream having any of said significances; and so that, in representing two successive bits in said stream of the same significance, and also in representing two successive bits in said stream having a different significance, the first bit is ended and the next commenced in the same one of said states; and distinguishing between said bits of different significance by shifting each of said single changes in state to a different time if it represents a bit of a first significance than if it represents a bit of a second significance.

26. The method as recited in claim 25, including recording said changes in state on a record track as changes in state thereof spaced irregularly in a relation indicating said bits of different significance by slight shifting of the changes in state longitudinally of the track.

27. The method that includes producing a data bit stream including a series of successive digital output signals representing in decoded form a series of changes in state of a unit actuable between a plurality of different significant states; controlling said signals to represent a single digital data bit in said stream for each change in state of said unit from one state to another without return, and so that, in producing signals representing two successive bits in said stream having the same significance, and also in producing signals representing two successive bits in said stream of different significance, said successive bits of the stream in each case represent two successive changes in state of said unit one ending and the next commencing in the same state; and distinguishing between said different types of digital data bits in said bit stream by reading out a particular change in state as a different type of bit if it occurs at a first time than if the same change in state is shifted slightly, less than one bit cell, to a different time.

28. Data processing apparatus comprising input means adapted to represent in coded form a series of data bits of two or more different types and actuable between a plurality of different significant states; output means for producing a series of output signals representing said series of data bits in decoded form; and decoding means responsive to said changes in state of said input means between said different significant states and acting while in continuous operation to produce output signals representing said bits at the rate of one bit for each change in significant state of said input means, from one of said states to another without return; said decoding means being operable to distinguish between said different types of bits by indicating a different type of bit if a particular change in state occurs at one time than if the same change in state is shifted slightly, less than one bit cell, to a different time; said input means being actuable between states of positive and negative electrical polarity and through a null condition on each of said changes in state thereof; said output means including an output flip-flop actuable between two different conditions to read out two different types of bits respectively; said decoding means including means for defining a regularly timed examining period continuing through a predetermined portion of each of a series of uniform length bit cells but not within the remainder of each cell, a first gate responsive to arrival of said electrical signal at a null condition and adapted to compare the timing of said null condition with the timing of said examining period and to actuate said flip-flop to a first condition if said null condition occurs during said predetermined portion of a cell, and a second gate responsive to arrival of said electrical signal at a null condition and adapted to compare the timing of said null condition with said examining period and to actuate said flip-flop to a second condition thereof if said null condition occurs during a different portion of a cell.

29. Apparatus as recited in claim 28, in which said means for defining said examining period include circuitry operable to initiate an examining signal in response to each actuation of said flip-flop by either of said gates but operable to introduce a predetermined greater delay into the initiation of said examining signal when said flip-flop is actuated by one gate than when it is actuated by the other gate, and in a relation compensating for differences in timing of the different null conditions and thereby producing said examining pulses during the same portion of each cell.

30. Data processing apparatus as recited in claim 29, in which said input means include a record playback unit operable to respond to a series of changes in state of a magnetic record track to actuate said input means between said different significant states thereof.

31. Data processing apparatus comprising input means adapted to represent in coded form a series of digital data bits of two or more different types and actuable between a plurality of different significant states; output means for producing a series of output signals representing said series of digital data bits in decoded form; and decoding means responsive to said changes in state of said input means between said different significant states and acting while in continuous operation to actuate said output means to produce output signals representing said bits at the rate of one digital bit for each change in significant state of said input means, from one of said states to another without return; said decoding means being operable, when decoding two successive bits of the same one of said types, and also when decoding two successive bits of different types, to actuate said output means to produce output signals representing said successive bits in response to two successive changes in state of said input means one of which ends and the second of which commences at the same state; said decoding means being operable to distinguish between said different types of bits by indicating a different type of digital bit if a particular change in state occurs at one time than if the same change in state is shifted slightly, less than one bit cell, to a different time; said output means including an output flip-flop actuable between two different conditions to read out two different types of bits respectively, said decoding means including means for defining an examining interval of predetermined length following each of said changes in state, and circuitry for actuating said flip-flop to indicate one type of bit if the next successive change in state occurs within said examining interval and to indicate another type of bit if said next successive change in state occurs after said examining interval.

* * * * *